(12) United States Patent
Ehrenberg

(10) Patent No.: US 6,447,567 B1
(45) Date of Patent: Sep. 10, 2002

(54) AIR FILTER ELEMENT WITH INTEGRAL RADIAL SEAL GASKET

(75) Inventor: Brian T. Ehrenberg, Kearney, NE (US)

(73) Assignee: Baldwin Filters, Inc., Kearney, NE (US)

( * ) Notice: Subject to any disclaimer, the term of this patent is extended or adjusted under 35 U.S.C. 154(b) by 0 days.

(21) Appl. No.: 09/854,650

(22) Filed: May 14, 2001

(51) Int. Cl.$^7$ .................................................. B01D 46/10
(52) U.S. Cl. ............................. 55/498; 55/499; 55/502; 55/510; 55/521; 55/DIG. 5
(58) Field of Search ................................. 55/385.3, 498, 55/502, 507, 509, 510, 511, 521, DIG. 5, 499

(56) References Cited

U.S. PATENT DOCUMENTS

| | | | | |
|---|---|---|---|---|
| 4,349,363 A | * | 9/1982 | Patel et al. ...................... 55/498 |
| 4,350,509 A | | 9/1982 | Alseth et al. ................... 55/337 |
| 4,634,527 A | * | 1/1987 | Marshall ........................ 55/498 |
| 4,720,292 A | | 1/1988 | Engel et al. .................... 55/337 |
| B1 4,720,292 A | | 9/1991 | Engel et al. .................... 55/337 |
| 5,071,456 A | * | 12/1991 | Binder et al. ................... 55/502 |
| 5,120,337 A | * | 6/1992 | Benzler et al. ................. 55/498 |
| 5,484,466 A | | 1/1996 | Brown et al. ................... 55/498 |
| 5,487,767 A | * | 1/1996 | Brown ........................... 55/498 |
| 5,730,769 A | * | 3/1998 | Dungs et al. ................... 55/502 |
| 5,755,843 A | * | 5/1998 | Sundquist ....................... 55/498 |
| 5,755,844 A | * | 5/1998 | Arai et al. ..................... 55/498 |
| 5,803,941 A | * | 9/1998 | Berkhoel et al. ................ 55/498 |
| 6,099,606 A | * | 8/2000 | Miller et al. ................... 55/502 |
| 6,159,261 A | * | 12/2000 | Binder et al. ................... 55/498 |
| 6,261,334 B1 | * | 7/2001 | Morgan et al. .................. 55/498 |
| 6,383,244 B1 | * | 5/2002 | Wake et al. ..................... 55/498 |

\* cited by examiner

*Primary Examiner*—Duane Smith
*Assistant Examiner*—Jason M. Greene
(74) *Attorney, Agent, or Firm*—Leydig, Voit & Mayer, Ltd.

(57) ABSTRACT

An air filter element having end caps molded of foam material, and in which one of the foam end caps also employs the foam material as a radial seal gasket. Tubular inner and outer liners support a tubular filter element. The first ends are molded in a closed urethane end cap sealing one end of the filter element. The other end is molded to provide an open end cap in the form of an annular ring which encases the filter element and the liners, and provides a radial seal gasket. A substantially rigid plastic ring has a base embedded in the open end cap annular ring, and an upstanding flange which carries the radial seal gasket. The ring closely fits within the inner liner, and the fit between the inner liner and ring provides a fluid restriction such that when the foamed urethane material forms on the annular flange, it carries up one side of the upstanding flange to form the ring, but is restrained from passing to the other side to leave an isolating gap between the other surface of the flange and the inner liner.

27 Claims, 7 Drawing Sheets

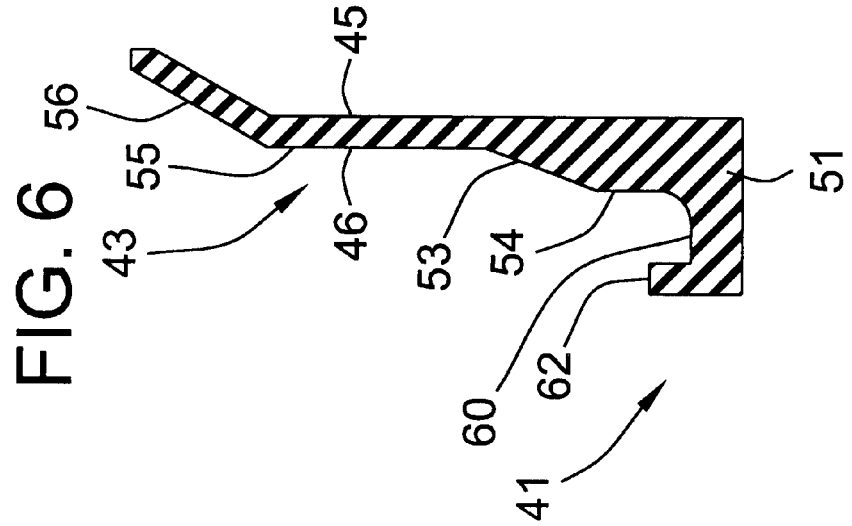
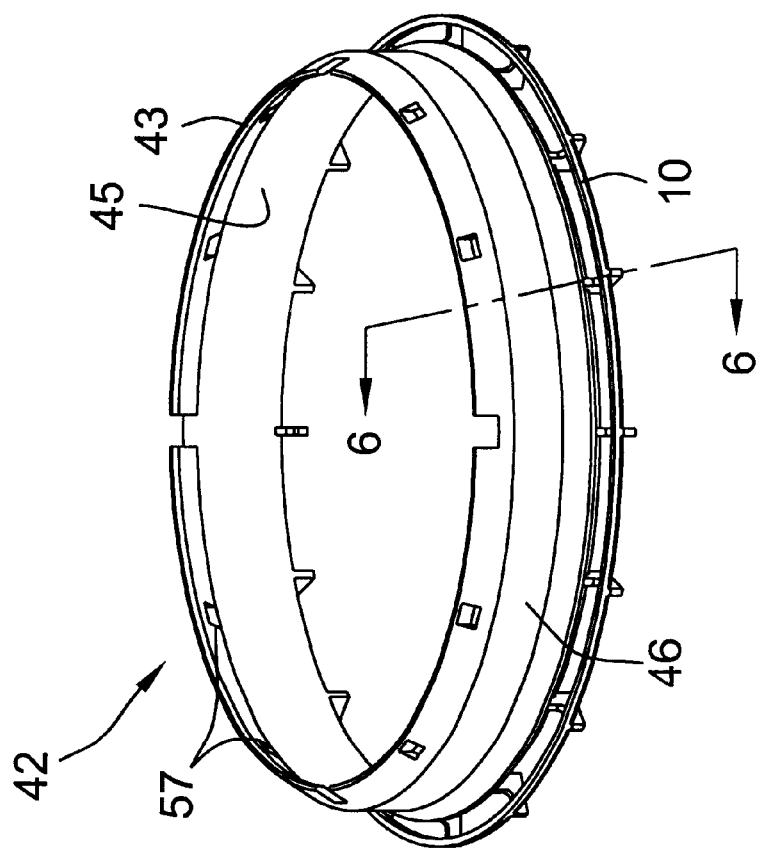

AIR FILTER ELEMENT WITH INTEGRAL RADIAL SEAL GASKET

FIELD OF THE INVENTION

This invention relates to air filters, and more particularly to an improved air filter providing a molded-in-place radial seal.

BACKGROUND OF THE INVENTION

Pleated paper filter elements are used on over-the-road trucks, agricultural, automotive and off-highway equipment for preventing dirt and dust from entering the engine with the incoming air supply. A popular type of air filter element is that which provides a radial seal, wherein a seal, usually on the inside of the open end of the filter, tightly engages a pipe or conduit which supplies air to the engine. In most cases, the air is drawn into the housing and through the air cleaner element in an outside-in direction. Contaminant in the air stream is removed by flowing through the pleated paper media whose ends are encapsulated into a close molded end cap at one side and an open molded end cap at the other side. The seal at the open end cap side is established by compressing or stretching an inward facing radial gasket made of rubber-like material around the outward facing surface of a cylindrical shaped outlet member of the housing.

U.S. Pat. No. 4,720,292 discloses an air filter element in which both end caps are molded. The radial seal filter on the open molded end cap is provided by the soft rubbery material which forms the end cap. The gasket portion itself is supported on the inner liner of the media pack. An advantage of the filter element is said to be the fact that the radial seal element is supported on the inner liner and the forces on the inner liner (such as those which result when the filter element is restricted) deflect the inner liner inwardly and increase the pressure on the radial seal. A filter element constructed according to these teachings has certain drawbacks, not the least of which is the fact that sealing force of the radial seal gasket is directly proportional to the forces exerted on the gasket by the inner liner. Thus, plugged filter conditions, which can distort the inner liner, can cause uneven forces on the gasket. The filter is also weak at the closed end cap side. The urethane potting compound from which the end cap is made can tend to deflect severely when subjected to relatively high pressure differentials.

U.S. Pat. No. 5,484,466 shows another air filter with a radial seal. The radial seal in the '466 patent is a separately formed nitrile element having a portion which is encapsulated into the formed end cap. The gasket element itself, while carried by the formed end cap, is a separate element and provides an independent radial seal. The structure shown in the '466 patent, however, suffers from the problem of being somewhat higher in cost than other filter elements due to the separately formed gasket member. The structure also leads to a filter which is somewhat heavier in weight and higher in cost.

SUMMARY OF THE INVENTION

A general aim of the present invention is to provide a cylindrical air filter with a formed-in-place radial seal gasket in which the formed-in-place gasket is substantially isolated from forces normally imposed on the inner liner.

It is an object to provide a radial seal air filter in which the radial seal is isolated from the inner liner, but which is lighter in weight and lower in cost than other isolated designs.

A further and detailed object is to provide a formed-in-place radial seal in an air filter which is closely centered with respect to the filter media pack, but which provides a sealing force which is substantially independent of the forces imposed on the media pack and its liners.

A resulting object is to provide a filter with a radial seal which has excellent seal integrity in high and low temperature extremes and under vibration conditions normally encountered.

Other objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention, and together with the description serve to explain the principles of the invention.

In the drawings:

FIG. 5 is a perspective view showing an insert ring of the embodiment of FIG. 2;

FIG. 6 is an enlarged sectional view of the insert ring taken generally along the line 6—6 of FIG. 5;

Figure 1:
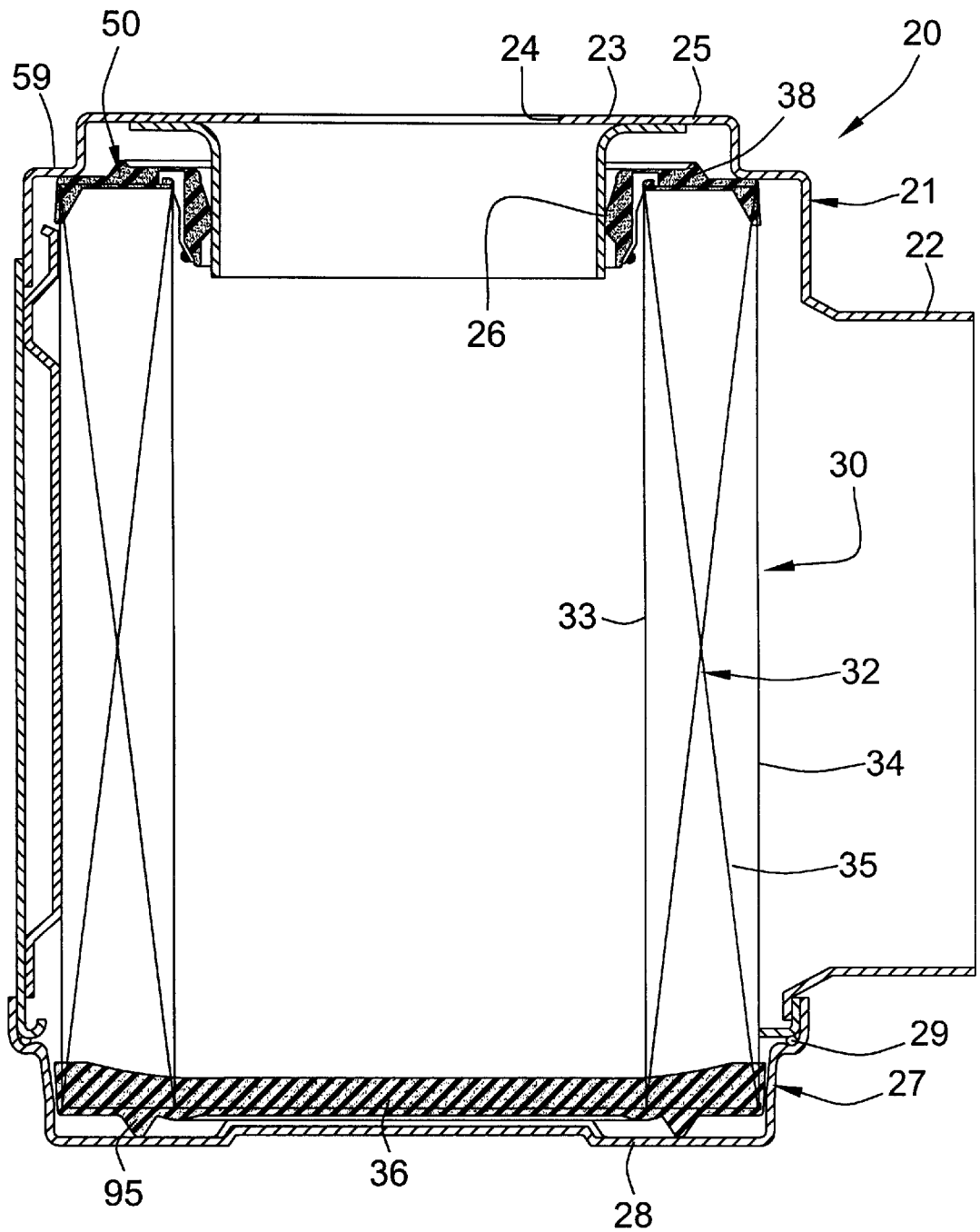
FIG. 1 is a cross-sectional view taken axially through an air filter unit equipped with a filter element constructed in accordance with the invention.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE PREFERRED EMBODIMENTS

Turning now to the drawings, for purposes of illustration, the invention has been shown in the drawings as incorporated in an air filter element 20 which is especially adapted for use with engines of over-the-road trucks and agricultural vehicles. The air filter unit 20 includes an outer shell 21 having a tubular inlet 22 for admitting unfiltered air into the unit. The shell also includes a top wall 23 having a centrally located outlet opening 24 for discharging filtered air to the intake of the engine. A plate 25 underlies and is secured to the top wall 24 and is formed with a centrally positioned sleeve 26 which extends downwardly a short distance into the shell 21.

Closing the bottom of the shell 21 is a selectively removable dish-shaped cover 27 having a bottom wall 28. The cover is sealed to the lower end of the shell by an O-ring 29 and may be pulled away from the lower end of the shell to permit access to the interior of the shell.

Figure 2:
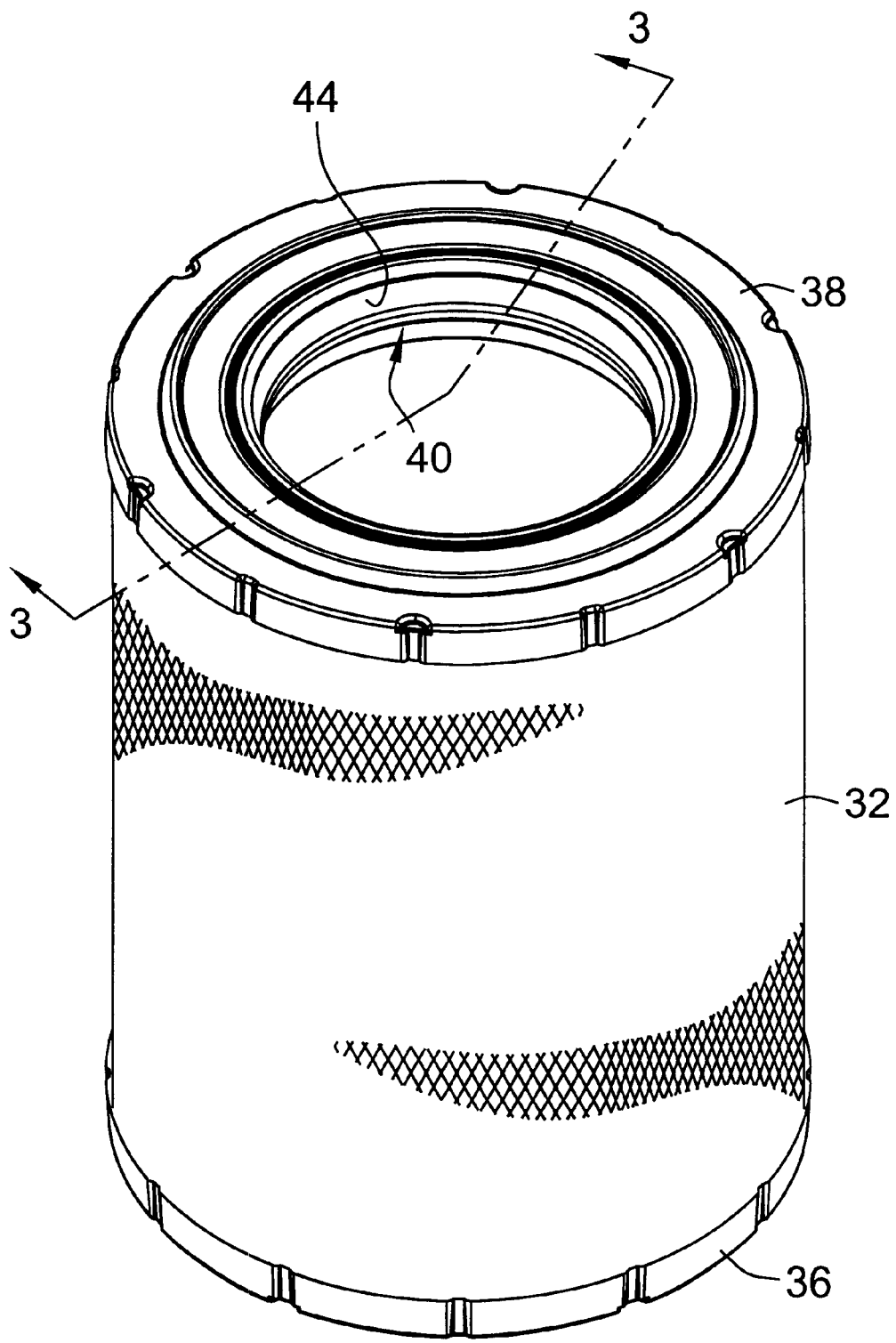
FIG. 2 is a perspective drawing of a filter constructed in accordance with the present invention.
Figure 3:
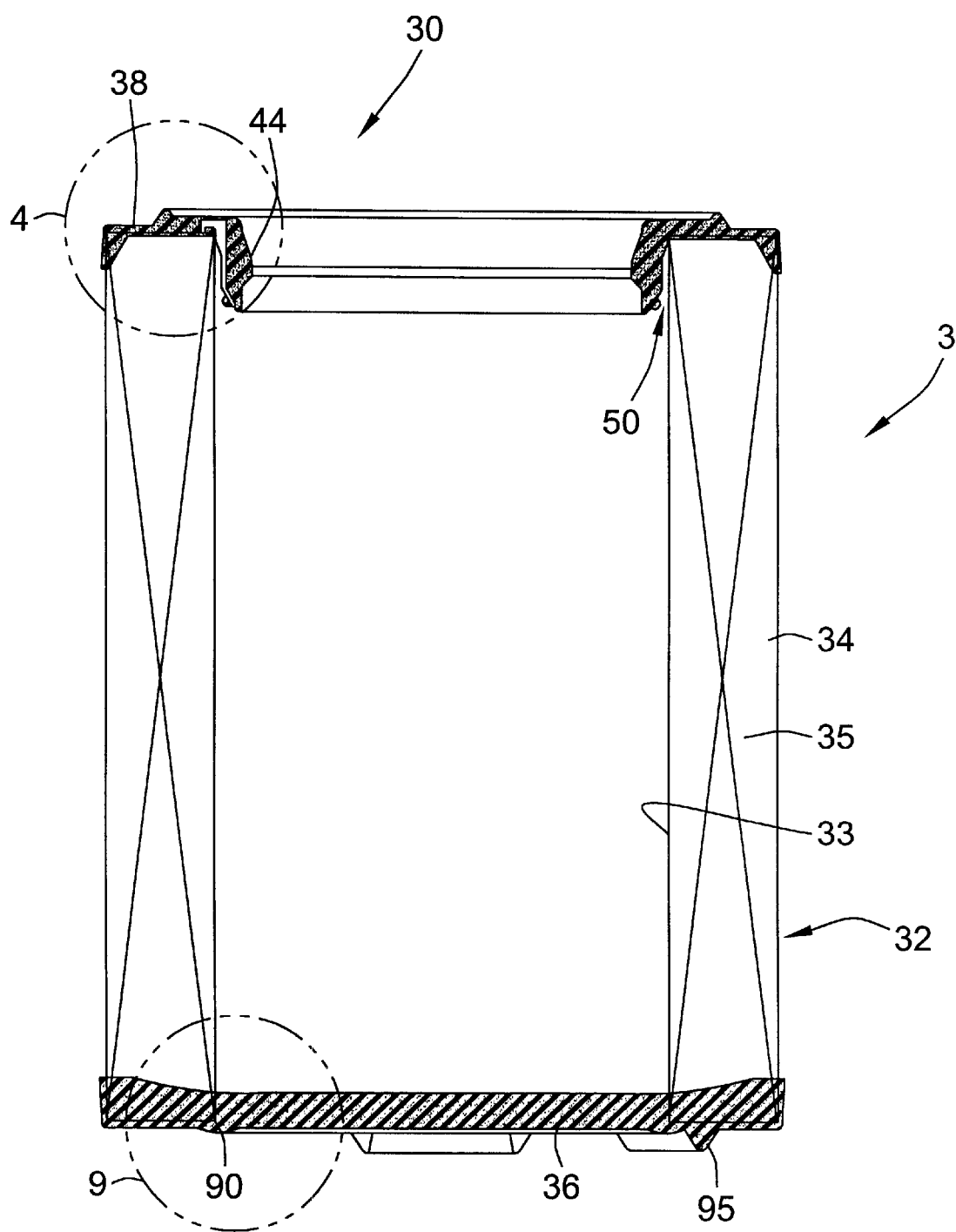
FIG. 3 is a sectional view taken generally along the lines 3—3 of FIG. 2.

Installed within the shell 21 is an air filter element 30 which, as also shown in FIGS. 2 and 3, is made up of a so-called filter media pack 32 which is made up of an inner liner 33 and an outer liner 34 sandwiching a tube of filter media 35. The lower end of the filter 30 is sealed by way of a closed end cap 36 which, as will be described below, is a potted element which encapsulates the filter media 35 and the liners 33, 34. The other end of the filter element 30 includes an open end cap in the form of an annular ring 38 which, like the end cap 36, encapsulates the ends of the filter media 35 and the liners 33, 34. Unlike the lower end cap, however, the upper end cap 38 has an aperture for receiving an air inlet element, in the present example the tube 26. In practicing the invention the end cap 38 is formed with a resilient radial seal 40 which is supported on a ring carried by the end cap 38, but is relatively isolated from the inner liner 33.

Figure 4:
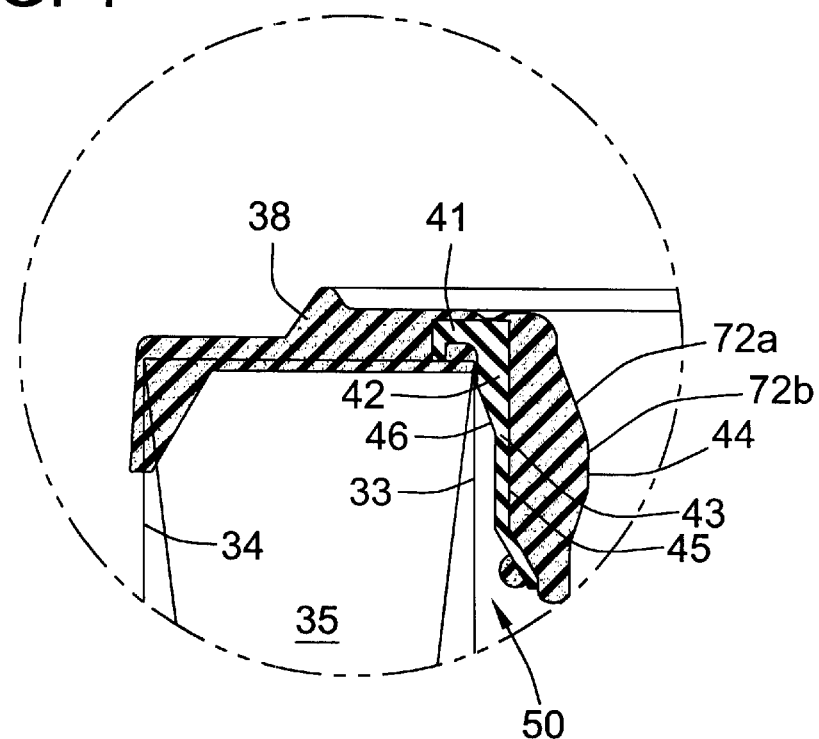
FIG. 4 is a partial sectional view in enlarged scale of the region of FIG. 3 identified by the circle 4.

The structure of the radial seal 40 and the open end cap 38 is best appreciated with concurrent reference to FIGS. 3 and 4. The open end cap 38, as will be described in greater detail below, is formed of a resilient rubbery material, in the preferred embodiment a foamed polyurethane which expands during cure. Embedded within the rubbery material is the base 41 of a substantially stiff insert ring 42. The insert ring 42 has a cylindrical flange 43 projecting from the end cap 38. A formed-in-place gasket 44, of the same material as the end cap 38, and formed concurrently with the end cap 38 is carried on a first surface 45 of the flange 43. A second or rearward facing surface 46 of the cylindrical flange 43 is substantially free of the urethane material which forms the end cap 38, so that a gap 50, substantially free of urethane material, is present between the surface 46 of the cylindrical flange and the inner liner 33. The comparative stiffness of the closed ring 42 and the gap 50 between the ring and the liner, serve to isolate the gasket 44 from the inner liner 33 for reasons which will be explained below.

The molding operation which forms the end cap 38 and unitary gasket 44 will be described below. Suffice it to say at the moment that the thus formed radial seal gasket 44, due to the fact that it is carried on the insert ring 42, and due to the fact that measures are taken to assure that the insert ring is concentric with the filter, is also concentric with the filter. The gap 50 which helps to substantially isolate the insert ring and its gasket from forces imposed on the inner liner, coupled with the relative stiffness of the ring, prevent forces on the inner liner, which might tend to change its shape, from being imposed as a varying force on the radial seal gasket. Thus, the gasket 44 maintains its seal under temperature extremes and in the presence of vibration, even when the loading on the inner liner 33 would attempt to impose uneven pressures. The ring 42, and particularly its flange 43 is described herein as being substantially stiff. By that is meant materials, typically plastic, which are rigid or semi-rigid and when formed in a ring shape as illustrated will tend to maintain shape and dimensional stability under conditions normally encountered in such filter applications.

It is also known that in the case, for example, of a blocked or partially blocked filter, the substantial change in pressure across the filter element can cause deflection of the filter element and the inner liner toward the center of the filter. These deflection forces are substantially isolated by virtue of the gap 50 and the minimal connection between the relatively stiff ring 41 and the filter pack elements in the end cap 38.

Turning now to FIGS. 5 and 6, there is shown in greater detail a preferred form of an insert ring useful in practicing the present invention. The ring 42 has a base section generally indicated at 41 and a flange section generally indicated at 43. As will be appreciated from FIG. 3, the base 41 is encapsulated in the end cap material 38 and the flange 43 projects from the end cap.

In greater detail, the ring 42 includes a plurality of feet 51 which are distributed about the periphery of the ring for supporting the ring in a mold during formation of the end cap. The flange section 43, supported by the base 41, includes a tapered portion 53 followed by a sealing portion 54. The portion 54 has an outer diameter which snugly fits within the inside of the inner liner, and thus serves as a fluid restriction. The tapered portion 53 guides the inner liner onto the sealing portion 54. The fit between the portion 54 and the inner liner can be considered a zero clearance fit, intended to restrict the foamed polyurethane from penetrating the fit to enter into the open area 50 (FIG. 4) between the unmolded surface of the flange and the inner liner. The foamed urethane will follow the path of least resistance as it expands, and the fluid restriction is intended to take advantage of that fact by allowing the urethane a lower resistance path into the pleats of the filter media. Supported above the sealing portion 54, in the illustrated embodiment by the tapered portion 53, is the gasket carrying flange 43 having a first surface 45 on which the gasket is to be formed and a second surface 46 which is to remain substantially free of gasket material. In the illustrated embodiment a tapered section 56 overlies the vertical portion 55 of the cylindrical flange 43. The tapered portion 56 serves to cap the rise of the urethane material. In addition it serves to further stiffen the ring, with increasing horizontal orientation serving to increase the ring stiffness. In the illustrated embodiment the ring also include a plurality of apertures 57 (see FIG. 5) through which the urethane material penetrates to form mechanical locks between the plastic insert ring 42 and the formed end cap 38.

The insert ring 42 also serves to locate the media pack 32 for the molding operation. To that end, each of the feet 51 includes a base surface 60 adapted to engage the bottom of the inner liner and serve as a stop for the inner liner. A continuous ring 62 is also carried on the feet 51. The ring 62 serves to engage the lower portion of the filter media 35 to fix the filter media in place during the molding operation. The outer liner is to be held in place by the mold as will be described below.

Figure 7:
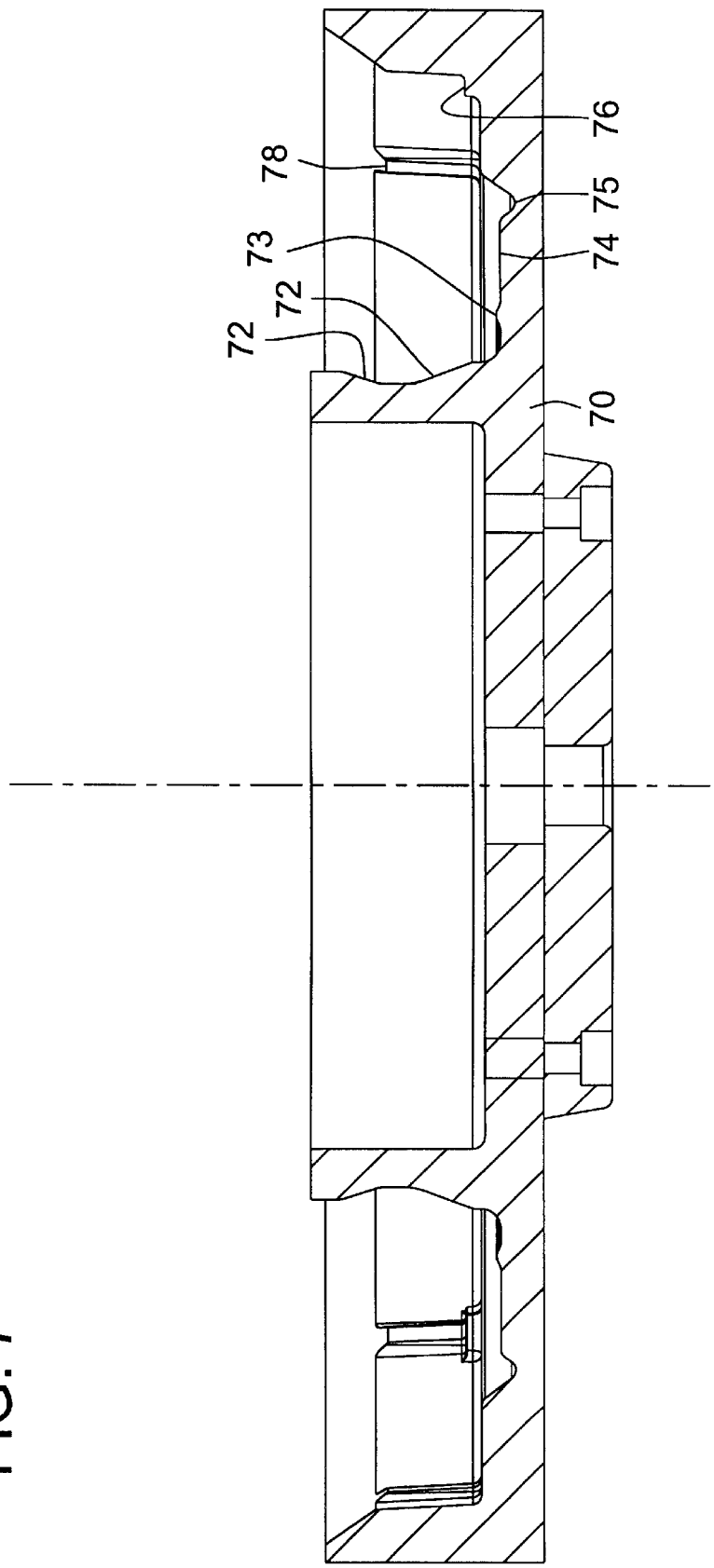
FIG. 7 is a diagram showing a mold for forming the gasketed open end cap of the filter of FIG. 2.

Turning now to FIG. 7, there is shown a mold which is useful in forming a molded end cap encapsulating a plastic insert ring as has been described above. A body 70 provides gasket forming surfaces 72 for defining the shape of the outer surface of the radial seal gasket. The preferred gasket has a tapered lead-in section 72a joining a substantially straight sided cylindrical sealing portion 72b. (See FIG. 4) The portions 72 of the mold are important in providing this feature. The base of the mold has a circular rim 73 on which the feet 51 of the ring are to be supported. A lower surface 74, positioned somewhat below the rim 73 is adapted to define the bottom of the gasket. A feature 75 for forming a locating rim is provided in the mold contour. An upper platform 76 is provided for supporting the outer liner and also serves as a seat for the outer portion of the filter element. Gripping notches are formed in the outer portion of the molded end cap by means of the localized formed notches 78.

Figure 8:
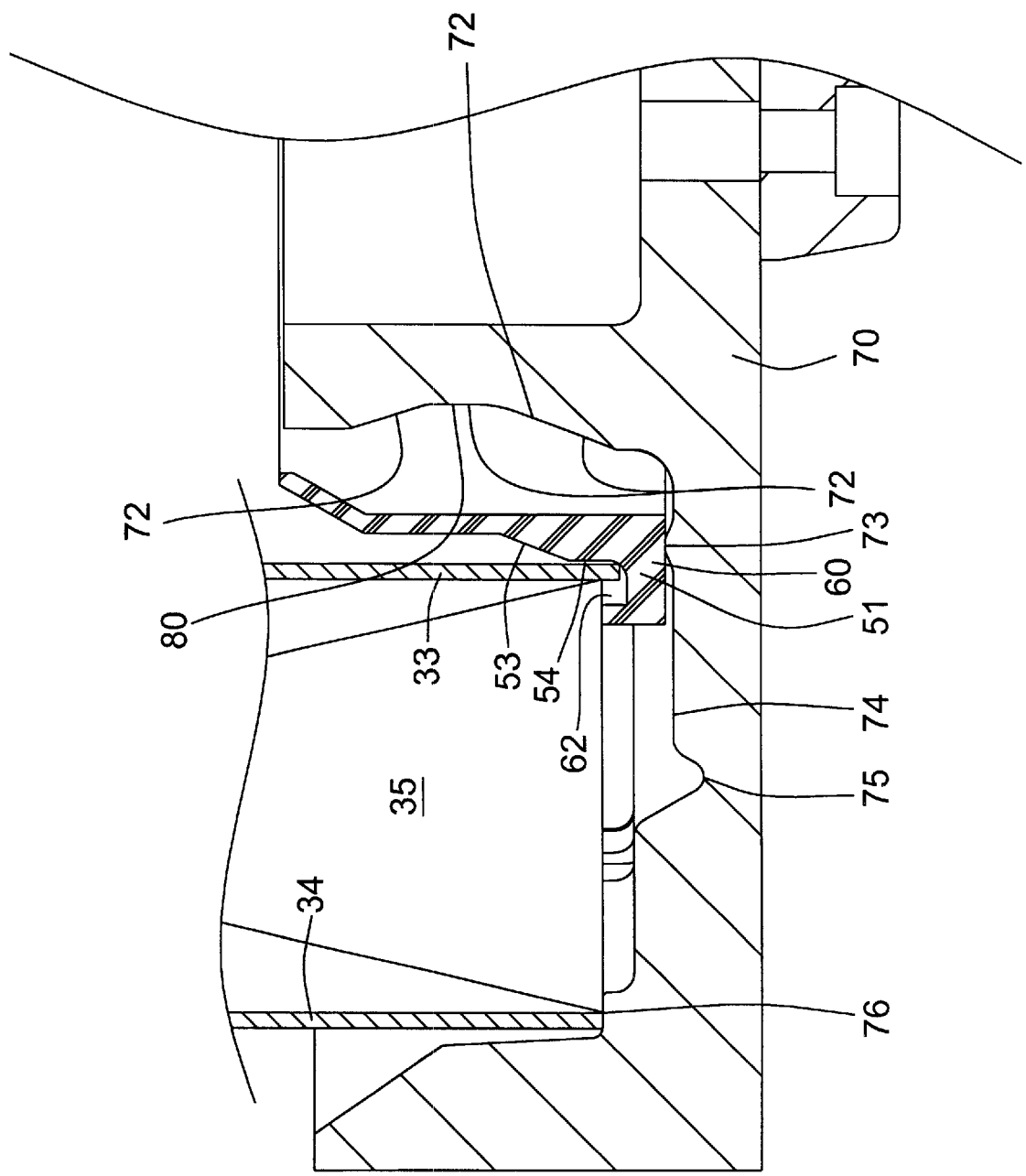
FIG. 8 is a diagram showing the left half of the mold of FIG. 7 and illustrating aspects of the molding operation for forming the gasketed end cap.

FIG. 8 shows the mold (left hand side only) placed in operative association with a filter media pack 32 during the molding operation. Just prior to placing of the filter elements, a measured quantity of urethane and activator material are deposited in the lower portion of the mold. The material is distributed by way of the shape of the mold such that a significant quantity of material is available to foam into and fill the area where the seal is to be formed.

It will be seen that with the ring in place, a chamber 80 is created which is the area in which the radial seal gasket will be formed. The transition and sealing surfaces 72a, 72b for the radial seal gasket are formed by the surfaces 72 of the mold. The second side of the chamber is bounded by the face 45 of the insert ring 42. It will be seen that the feet 51 of the ring 42 sit on the base 73. It will also be seen that the inner liner has been guided by tapered section 53 of the insert ring into contact with the sealing section 54 while being supported at the portion 60 of the feet 51. The tubular filter element is supported on the ring 62 near it inner periphery, and on the floor 76 at its outer periphery. The outer liner is also supported on the floor 76. A sufficient space between the outer liner and the end wall of the mold provides for a rubber seal which encapsulates the outer liner.

With the urethane and activator materials having been placed, the material will immediately begin to expand to fill the gap 80 and form the radial seal gasket. At the same time, the material will rise to a lesser extent to encompass and encapsulate the lower portions of the inner and outer liners and the lower portion of the filter media. The floor of the molded material and the outer periphery of the molded material are determined by the shape of the mold, while the upper extent, the penetration into the filter, is controlled by the quantity of material which is placed. The fluid restriction between the inner liner and the surface 54 of the sealing ring tend to restrain the foaming urethane from entering the gap 50 (FIG. 4) which is formed between the cylindrical flange and the inner liner.

After curing of the urethane material, which is relatively quick, the filter is removed from the mold portion 70. The gasket portion 72 has sufficient resilience to allow removal of the molded end cap from the mold 70. The filter can then be inverted and the second closed end cap encapsulated to completely seal the second end.

Figure 9:
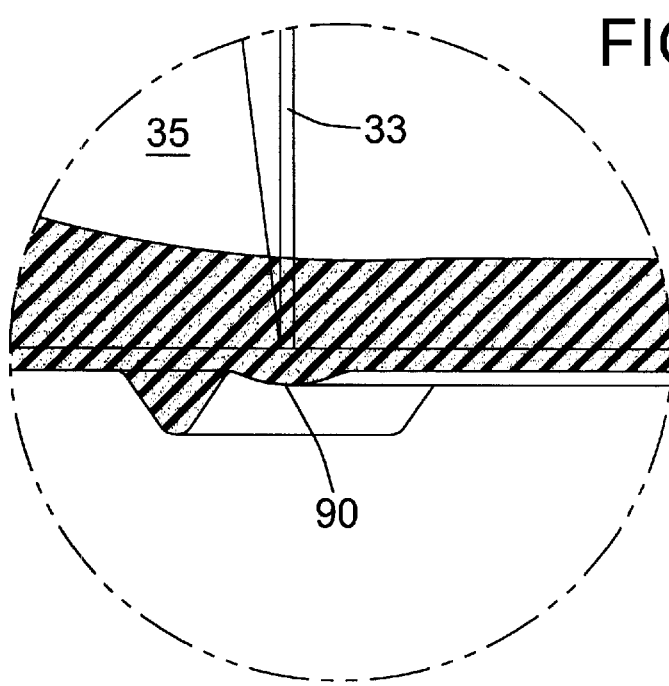
FIG. 9 is a partial diagram showing a portion of the closed end cap of the filter of FIG. 2 and showing, on an enlarged scale, the area designated by the circle 9 of FIG. 3.

The mold portions for the closed end cap are not illustrated in the drawings. All that is required is a relatively simple lower mold cup, since upper expansion need not be controlled by a mold, but can be controlled solely by placement and quantity of materials. One feature of significance in the lower mold is the provision of a rim 95 (a depression in the mold) which is substantially congruent with the position of the inner liner. Forming the mold in that fashion forms the end cap as best illustrated in FIG. 9 with an enlarged circular ridge 90 which represents an increase in material quantity and thickness at the position where the inner line is encapsulated into the closed end cap. This extra material tends to reduce stress concentrations which would otherwise be imposed on the relatively thin end cap material. It helps to prevent failure of the end cap or movement of the inner liner within the end cap. The closed end cap can also be formed to produce mounting feet 95 (see FIG. 1) as is conventional.

It will now be appreciated that what has been provided is an improved form of cylindrical air filter which is characterized by economy of manufacture coupled with a structure in which the radial seal formed in the open end cap is substantially isolated from the inner liner. A substantially stiff insert ring has a base encapsulated in the foam material which forms the end cap and an upstanding cylindrical flange which carries the radial seal gasket on one surface and is protected from deposit of substantial urethane material on the other surface.

The foregoing description of various preferred embodiments of the invention has been presented for purposes of illustration and description. It is not intended to be exhaustive or to limit the invention to the precise forms disclosed. Obvious modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An air filter element comprising in combination:
    a tubular filter media having first and second ends;
    tubular inner and outer liners supporting the filter media and also having first and second ends;
    the filter element having a closed end cap formed of molded foam material encapsulating the first ends of the liners and the filter media;
    an insert ring of substantially stiff plastic material and having:
        a cylindrical flange having an inner surface positioned to support a gasket;
        a sealing portion supporting the cylindrical flange and sized to snugly fit within the inner liner to form a fluid restriction; and
        a base portion supporting the sealing portion;
    the insert ring being fit within the second end of the inner liner with the sealing portion snugly engaging the inner liner;
    an open end cap formed of molded compressible foam material of sufficient resilience to serve as a gasket, the foam material encompassing the base portion of the insert ring, the second ends of the liners and filter media and the inner surface of the cylindrical flange, the shape and dimension of said foam material on the inner surface being configured to form a sealing gasket as part of the open end cap; and
    the fluid restriction restraining the foam material from filling the area between the cylindrical flange and the inner liner.

2. The combination of claim 1 wherein the insert ring has a tapered portion intermediate the cylindrical flange and the sealing portion, the tapered portion being sized to engage the inner liner for guiding the inner liner to the sealing portion.

3. The combination of claim 2 wherein the sealing portion comprises a substantially straight-sided cylindrical portion positioned between the tapered portion and the base portion.

4. The combination of claim 1 further including a liner support positioned below the sealing portion and supported by the base portion.

5. The combination of claim 4 wherein the base portion comprises a plurality of feet supporting the sealing portion and defining the liner support.

6. The combination of claim 5 further including a ring shaped filter media support positioned on the plurality of feet in a position to support the filter media.

7. The combination of claim 6 wherein the cylindrical flange of the insert ring includes an upper tapered section positioned to limit the travel of the compressible foam material during molding.

8. The combination of claim 7 wherein the angle of the taper is sufficient to enhance the stiffness of the insert ring.

9. The combination of claim 7 wherein the upper tapered section includes a plurality of apertures filled with the foam material for providing a mechanical lock between the insert ring and the foam material for causing the material to fill said apertures and prevent rotation of the ring in the filter.

10. The combination of claim 1 wherein the shape of the foam material on the inner surface of the cylindrical flange includes a tapered lead-in portion joining a substantially straight-sided cylindrical sealing portion of said gasket.

11. The combination of claim 1 wherein the closed end cap includes a raised ridge concentric with the filter element and positioned over the inner liner to reduce stress concentration caused by flexing of the inner liner.

12. An air filter element comprising in combination:
   a tubular filter media having first and second ends;
   tubular inner and outer liners supporting the tubular filter media and also having first and second ends;
   a closed end cap formed of molded foam material encapsulating the first ends of the liners and the filter media;
   an open annular end cap formed of molded foam material encapsulating the second ends of the liners and the filer media, the open annular end cap having a gasketed opening of a size and configuration for connection to an air outlet;
   a gasket-supporting insert ring of substantially stiff plastic material and having:
      a base portion sized and positioned to be encapsulated within the annular end cap;
      a generally cylindrical flange sized and positioned to support a gasket which fits the air outlet; and
      a connecting portion intermediate the base and flange portions, the connecting portion being sized and positioned to fit within the inner liner to fix the position of the cylindrical flange in the filter element;
   the insert ring being fit in the inner liner with the connecting portion in contact with the inner liner thereby to fix the cylindrical flange portion with respect to the liners and filter media;
   the open annular end cap being formed of molded compressible foam material of sufficient resilience to serve as a gasket, the foam material encompassing the base portion of the ring, the second ends of the liners and the filter medias and one side of the cylindrical flange to form said gasket.

13. The combination of claim 12 wherein the insert ring has a tapered portion intermediate the cylindrical flange and the connecting portion, the tapered portion being sized to engage the inner liner for guiding the inner liner to the connecting portion.

14. The combination of claim 13 wherein the connecting portion comprises a substantially straight-sided cylindrical portion positioned between the tapered portion and the base portion.

15. The combination of claim 12 further including a liner support positioned below the connecting portion and supported by the base portion.

16. The combination of claim 15 wherein the base portion comprises a plurality of feet supporting the connecting portion and defining the liner support.

17. The combination of claim 16 further including a ring shaped filter media support positioned on the plurality of feet in a position to support the filter media.

18. The combination of claim 12 wherein the shape of the foam material on the cylindrical flange includes a tapered lead-in portion joining a substantially straight-sided cylindrical sealing portion of said gasket.

19. The combination of claim 12 wherein the closed end cap includes a raised ridge concentric with the filter element and positioned over the inner liner to reduce stress concentration caused by flexing of the inner liner.

20. An air filter element comprising in combination:
   a filter pack comprising a tubular filter element and at least an inner supporting liner;
   a closed end cap sealing the filter element and encapsulating one end of the filter pack;
   an open annular end cap encapsulating the other end of the filter pack and providing a formed-in-place gasket thereon, the open annular end cap comprising:
      a substantially stiff insert ring having a base portion embedded in the annular end cap and a gasket-carrying flange projecting from the annular end cap;
      the gasket-carrying flange having a first gasket-carrying surface projecting from the annular end cap and carrying a formed-in-place foam surface for forming said gasket;
      the insert ring also having a sealing portion engaging the inner liner and forming a fluid restriction which restrains the foam material from filling the area between the flange and the inner liner; and
      the annular end cap being formed by a foaming urethane which encapsulates the second end of the filter pack and fills a mold to form said gasket while being restrained from filling the gap between the flange and the inner liner.

21. The combination of claim 20 wherein the insert ring has a tapered portion intermediate the gasket-carrying flange and the sealing portion, the tapered portion being sized to engage the inner liner for guiding the inner liner to the sealing portion.

22. The combination of claim 21 wherein the sealing portion comprises a substantially straight-sided cylindrical portion positioned between the tapered portion and the base portion.

23. The combination of claim 22 further including a liner support positioned below the sealing portion and supported by the base portion.

24. The combination of claim 23 wherein the base portion comprises a plurality of feet supporting the sealing portion and defining the liner support.

25. The combination of claim 24 further including a ring shaped filter media support positioned on the plurality of feet in a position to support the filter media.

26. The combination of claim 20 wherein the shape of the gasket on the gasket carrying surface of the flange includes a tapered lead-in portion joining a substantially straight-sided cylindrical sealing portion.

27. The combination of claim 20 wherein the closed end cap includes a raised ridge concentric with the filter element and positioned over the inner liner to reduce stress concentration caused by flexing of the inner liner.

* * * * *

UNITED STATES PATENT AND TRADEMARK OFFICE
CERTIFICATE OF CORRECTION

PATENT NO. : 6,447,567 B1
DATED : September 10, 2002
INVENTOR(S) : Brian T. Ehrenberg It is certified that error appears in the above-identified patent and that said Letters Patent is hereby corrected as shown below:

<u>Column 7,</u>
Line 44, change "medias" to -- media, --

Signed and Sealed this

Fourth Day of February, 2003

JAMES E. ROGAN
*Director of the United States Patent and Trademark Office*